US008042408B2

(12) United States Patent
Geyer et al.

(10) Patent No.: US 8,042,408 B2
(45) Date of Patent: Oct. 25, 2011

(54) COUPLING SYSTEM WITH A SENSOR AND AN EVALUATION UNIT

(75) Inventors: Gerhard Geyer, Kulmbach (DE); Norbert Ermer, Mistelgau (DE)

(73) Assignee: Stäubli Tec-Systems GmbH, Bayreuth (DE)

( * ) Notice: Subject to any disclaimer, the term of this patent is extended or adjusted under 35 U.S.C. 154(b) by 216 days.

(21) Appl. No.: 12/438,540

(22) PCT Filed: Aug. 21, 2007

(86) PCT No.: PCT/EP2007/007429
§ 371 (c)(1),
(2), (4) Date: Jul. 9, 2009

(87) PCT Pub. No.: WO2008/022793
PCT Pub. Date: Feb. 28, 2008

(65) Prior Publication Data
US 2010/0067981 A1 Mar. 18, 2010

(30) Foreign Application Priority Data

Aug. 23, 2006 (DE) .......................... 10 2006 040 034

(51) Int. Cl.
*G01N 3/02* (2006.01)

(52) U.S. Cl. .......................................... 73/856; 73/860

(58) Field of Classification Search ............. 73/850–860
See application file for complete search history.

(56) References Cited

U.S. PATENT DOCUMENTS

| 4,227,420 | A | * | 10/1980 | Lamadrid | ........................ 73/756 |
| 5,145,227 | A | | 9/1992 | Monford, Jr. | |
| 5,467,806 | A | * | 11/1995 | Stricklin et al. | .............. 141/346 |
| 6,530,396 | B1 | * | 3/2003 | Frey | ................................ 137/557 |
| 2004/0180769 | A1 | | 9/2004 | Perry et al. | |
| 2010/0286596 | A1 | * | 11/2010 | Hofmann et al. | ................ 604/35 |

FOREIGN PATENT DOCUMENTS
JP 05301186 11/1993
(Continued)

OTHER PUBLICATIONS

PCT International Search Report and Written Opinion for PCT/EP2007/007429, Applicant Stäubli Tec Systems GMBH, dated Nov. 30, 2007, forms PCT/ISA/210, 220 and 237, German language document previously submitted to the USPTO on Feb. 23, 2009 (13 pages).

(Continued)

*Primary Examiner* — Max Noori
(74) *Attorney, Agent, or Firm* — Vista IP Law Group LLP

(57) ABSTRACT

The invention relates to a coupling system, a coupling arrangement, a method for mechanically coupling a coupling system and a method for measuring the mechanical loading of a coupling system. The coupling system according to the invention includes a first coupling part, at least one second coupling part, which can be coupled with the first coupling part by way of at least one coupling, and at least one sensor, wherein the first coupling part has an evaluation unit (5), which can be connected to the at least one sensor for sensing measuring signals, and the measuring signals that are sensed by the evaluation unit (5) can be called up by way of the evaluation unit, wherein the coupling in the coupling area can be checked by means of the at least one sensor.

20 Claims, 4 Drawing Sheets

FOREIGN PATENT DOCUMENTS

JP         07237165         9/1995

OTHER PUBLICATIONS

Figure 3:
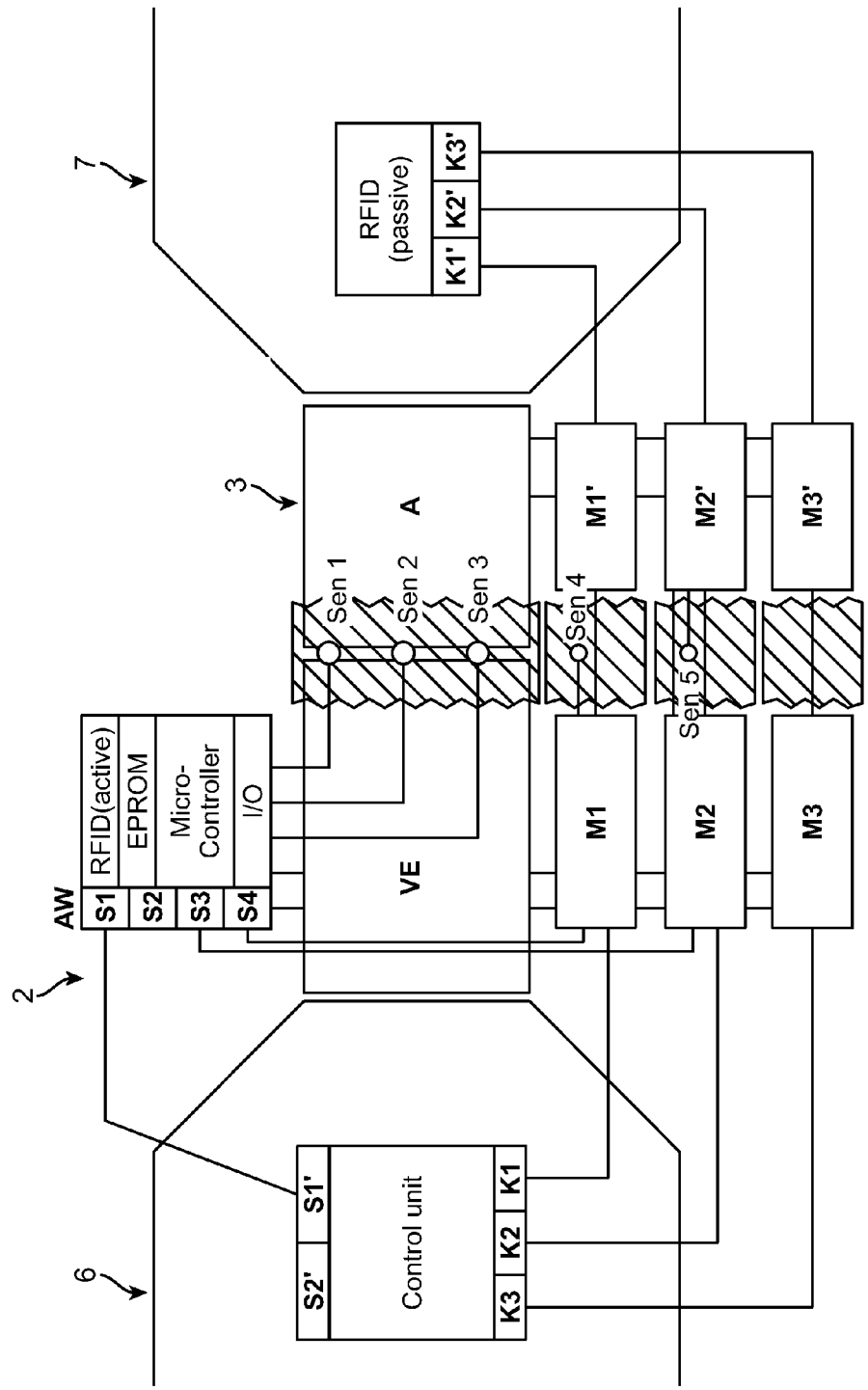

PCT International Preliminary Report on Patentability, for PCT/EP2007/007429, forms PCT/IPEA/416 and 409, Applicant Stäubli Tec Systems GMBH, original document in German language dated Oct. 20, 2008 previously submitted to the USPTO on Feb. 23, 2009 (7 pages), English translation dated Mar. 12, 2009 previously submitted on Apr. 27, 2009 (6 pages).

* cited by examiner

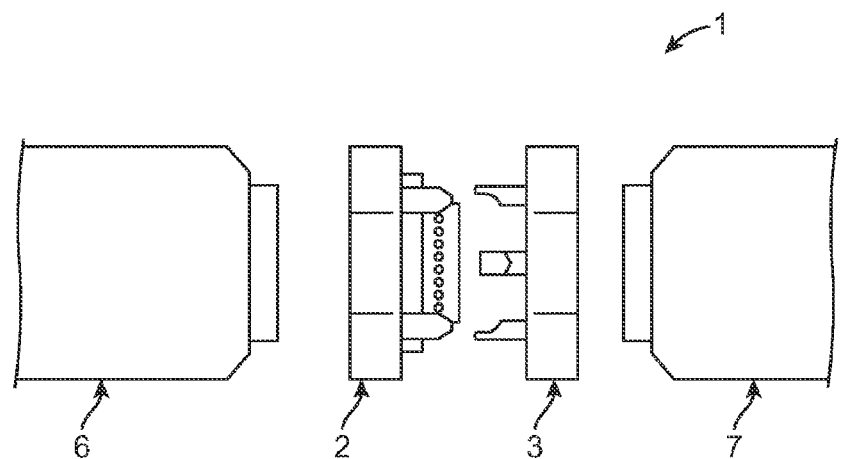
FIG. 1
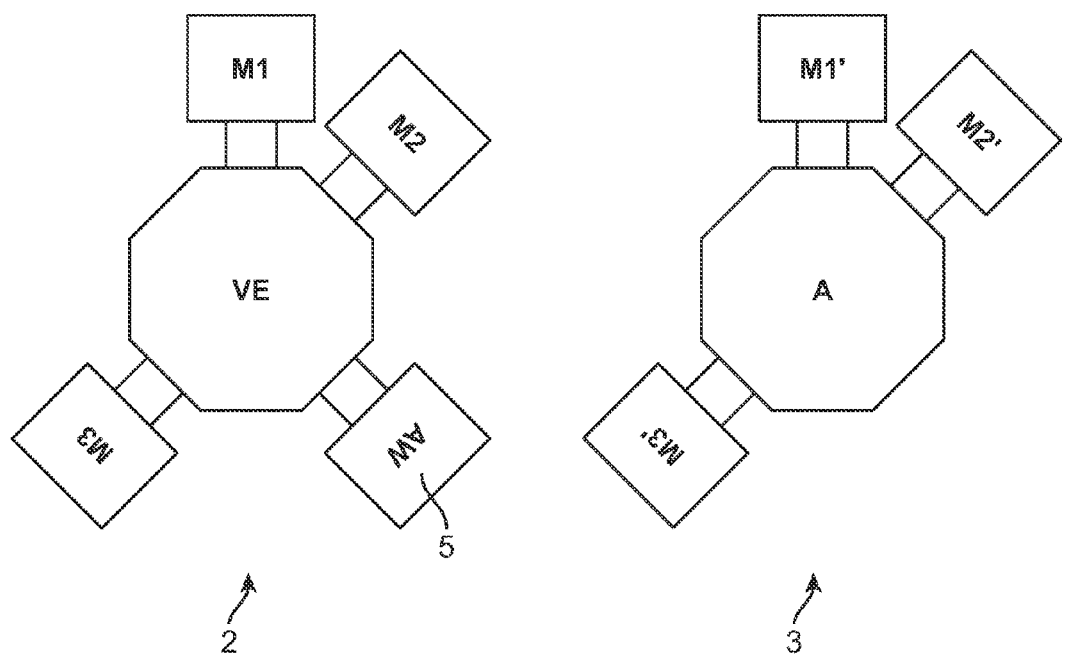
FIG. 2a
FIG. 2b

COUPLING SYSTEM WITH A SENSOR AND AN EVALUATION UNIT

This Application is a U.S. National Stage filing under 35 U.S.C. §371 of International Application No. PCT/EP2007/007429, filed Aug. 21, 2007, which claims priority to German Patent Application Serial No. 10 2006 040 034.8, filed Aug. 23, 2006. Priority to the aforementioned applications is hereby expressly claimed in accordance with 35 U.S.C. §§119, 120, 365 and 371 and any other applicable statutes.

The invention relates to a coupling system, in particular a tool change system for robots, a coupling arrangement, a method for mechanical coupling of a coupling system and a method for measuring the mechanical loading of a coupling system during coupling and/or in the coupled state.

Coupling systems which have a first coupling part and at least one second coupling part which can be coupled to the first coupling part via at least one coupling are basically known. For example, such a coupling can be a mechanical coupling, an electrical coupling or a coupling for coupling of media, such as water, compressed air etc. Furthermore, coupling systems are known which have a plurality of couplings, for example a plurality of electrical couplings and a compressed air coupling. In this case, it is termed a multicoupling system.

Furthermore, it is known to use coupling systems of this type for the connection of tools to a robot. In particular, coupling systems are known which are termed tool change systems which make it possible to change the tool located on the robot arm in a rapid and simple manner. Normally, tool change systems of this type have a locking unit and an adaptor which can be coupled to the locking unit. The locking unit is connected securely to an arm of the robot, whilst one or more adaptors are connected to suitable tools. Hence, a uniform coupling between robot and tools is produced. A coupling system of this type comprises at least one mechanical coupling but also further couplings can be provided which make it possible to transfer power, cooling water etc. from the robot side to the tool side.

The disadvantage of coupling systems of this type is that the coupling region represents a weak point in the overall system. Examples of this are that the coupling parts are not connected to each other correctly (which would be possible for example due to faulty coupling), the coupling is contaminated or the couplings themselves are damaged, which is likewise possible for the reason that the coupling regions are relatively exposed in general. Also inexpert handling can have an effect on the functionality of the coupling.

It is hence the object of the present invention to produce a coupling system which makes it possible to check the state of one or more couplings in the coupling region. A further object of the invention is to produce a coupling arrangement which enables fault-free coupling of the coupling parts of a coupling system. Furthermore, it is an object of the invention to produce a method for mechanical coupling of a coupling system and a method for measuring the mechanical loading of a coupling system.

These objects are achieved by a coupling system, a coupling arrangement, a method for mechanical coupling and a method for measuring the mechanical loading according to the independent claims.

The invention produces a coupling system, containing a first coupling part, at least one second coupling part which can be coupled to the first coupling part via at least one coupling, and at least one sensor, the first coupling part having an evaluation unit which can be connected to the at least one sensor for detecting measuring signals, and the measuring signals detected by the evaluation unit being able to be called up via the evaluation unit, the coupling in the coupling region being able to be checked by means of the at least one sensor.

According to the invention, it is hence possible to check the state of the coupling during coupling and/or in the coupled state for the functionality thereof. As a result of the measuring values which can be called up via the evaluation unit, it is possible to initiate a corresponding reaction, for example an exchange of tools, maintenance or a correction of the movement. In particular for systems in which coupling takes place frequently, for example in tool change systems, and hence the danger is relatively high that the coupling did not come to be operational or the coupling was damaged in the course of the operation, the use of such a system for checking is advantageous.

The invention is not restricted to specific types of coupling. There are possible for example as coupling types, mechanical couplings, electrical couplings, couplings of media lines, for example for water, compressed air, oil etc.

For example, a noise sensor can be used for checking a media coupling for a gaseous medium, for example compressed air.

The sensor can be applied in particular to the first or to the second coupling part. It is preferred according to the invention that the at least one sensor is applied to the first coupling part on which the evaluation unit is also located. In this way, a compact system is produced, on the one hand, since the connections for actuating and reading the sensor can be produced simply with the evaluation unit. Furthermore, it is as a result no longer necessary, in the case of a plurality of second coupling parts which can be connected to the first coupling part, to equip each of the second coupling parts with sensors. In addition, the application of the sensor to the first coupling part makes it possible to measure measuring signals independently of the state and the position of the second coupling part, in particular also during the coupling process.

The first coupling part can preferably be connected to the supply side of a device, for example to a robot arm. This makes it possible to operate sensor and evaluation unit independently of a coupling. Furthermore for operation of the evaluation unit and/or of the sensor, advantageous or even necessary connections, for example a power supply or a data cable, need not themselves be connected to additional couplings.

The evaluation unit can be for example an electronics unit with an interface in order to be able to transmit the received measuring data externally. The transmission of the data can be effected for example to a display or else into a network. According to the invention, it is preferred that the data can be called up via teletransmission. This enables the data to be called up without a data cable requiring to be connected directly to the evaluation unit, which can possibly be very complex or even impossible. Furthermore, the evaluation unit can contain a control unit which can effect a reaction dependent upon the detected measuring signals, for example can interrupt coupling. Preferably, the evaluation unit is equipped with a programmable computing unit, which makes it possible to process the detected measuring signals via programmes and to cause suitable reactions via programmes.

Sensors which measure without contact or with contact are suitable as sensors.

As measuring variables there are suitable for example loading variables, such as mechanical stress, mechanical deformation, positions, in particular movements and relative movement, pressures, temperatures, electrical resistances etc.

An advantageous development of the invention provides that the evaluation unit has a permanent memory, by means of which the signals of the sensor can be stored permanently over a period of time.

This development makes it possible to consider the history of the coupling system. This is advantageous in particular for maintenance of the coupling system but also for maintenance of the elements which are connected to the coupling system and likewise affect the measuring signals detected by the sensors. It is not only possible via the analysis of the values stored in the memory to decide whether maintenance of the system is necessary. It is basically likewise possible to assess by means of the values whether the coupling system and/or the parts connected to the coupling system have been handled correctly. In particular, inexpert loading or faulty operation can be detected subsequently in this way. On the other hand, with reference to the history of the measuring signals, it can be detected when maintenance is sensible, i.e. it can be estimated exactly how long the device can continue to be operated.

A power supply system is preferably integrated in the evaluation unit, which can bridge at least a short power failure. A system of this type could be formed for example by a capacitor.

The evaluation unit and the memory are preferably sealed in order to protect these from misuse.

The evaluation unit preferably has an identification system which makes it possible to identify the elements connected to the second coupling part, for example tools. The identification could be stored for example as a value in the permanent memory. This makes it possible to understand under which conditions the coupling system was used.

A further advantageous development provides that the coupling system is a multicoupling system, preferably a tool change system, the first coupling part being a locking unit for attachment to a robot and the second coupling part an adaptor for attachment to a tool.

The adaptor can be an independent component or else also be integrated in the tool.

The locking unit can contain further modules, for example modules via which data, power, water etc. can be transmitted to a tool. In this respect, the adaptor advantageously has corresponding modules via which the transmission of the mentioned media via coupling of the mutually corresponding modules of locking unit and adaptor is possible.

A further advantageous development of the invention provides that the at least one sensor is a force sensor, by means of which the mechanical forces which are exerted on the locking unit via the adaptor can be measured at least partially.

A sensor of this type makes it possible to establish the mechanical loading of the coupling system. Hence also the mechanical loading on the tool which is connected to the adaptor can be observed indirectly.

For example strain gauges or piezo elements are suitable as force sensors. Contact-free measurement is also basically possible, for example via optical sensors.

A further advantageous development provides that the locking unit has at least one peg-shaped raised portion, and the adaptor has at least one recess corresponding to the peg-shaped raised portion, peg-shaped raised portion and recess being configured and disposed in such a manner that, during coupling of the adaptor and the locking unit, the peg-shaped raised portion of the locking unit engages in the recess of the adaptor for guiding the adaptor and, in the coupled state, the adaptor is connected mechanically to the locking unit via the peg of the locking unit, and the force sensor is disposed in such a manner that mechanical loading of the peg can be measured by means of the force sensor.

The force sensor is disposed according to the invention in such a manner that the mechanical loading of the peg can be measured at least in one direction, preferably in two directions, particularly preferred in all three spatial directions. If necessary, a plurality of sensors is provided for this purpose, in particular one sensor per spatial direction.

Preferably, at least two peg-shaped raised portions with corresponding recesses are provided, particularly preferred at least three peg-shaped raised portions with corresponding recesses. As a result, the mechanical stability of the coupling system is increased, on the one hand, and, on the other hand, the mechanical loading of the coupling system, in particular with respect to bending and torsion, can be understood well by the different positions of the sensors. Preferably, the peg-shaped raised portions are aligned parallel to each other. Furthermore, the peg-shaped raised portions are preferably distributed uniformly over a coupling surface of the first coupling part in order to be able to absorb as uniformly as possible a mechanical loading acting in the coupled state of the first and second coupling part.

Preferably, the at least one peg-shaped raised portion is bevelled at the tip thereof, particularly preferred has a conical configuration. As a result, the coupling process to the adaptor is facilitated.

Preferably, the recess corresponding to the peg-shaped raised portion of the adaptor has a base shaped corresponding to the tip. If the tip of the peg is shaped or conical, then a clamping effect can be achieved with a recess of this type, which clamping effect stabilises the coupling of the locking unit and adaptor mechanically in addition.

A further advantageous development of the invention provides that the at least one force sensor is disposed in or on the at least one peg-shaped raised portion.

Preferably, the sensor is directly in or on the peg in order to produce a good mechanical connection to the mechanically loaded region, in order to enable a measurement with high resolution as directly as possible.

In particular, a plurality of force sensors per peg can be provided, in particular in order to be able to measure loadings in different directions.

A further advantageous development provides that the locking unit has at least one position sensor which checks the position of locking unit and adaptor in at least one position before the coupling position.

A sensor of this type is suitable in particular for checking whether the coupling process has been effected operationally correctly up to this position.

There are suitable as sensors for example optical sensors or magnetic sensors. Preferably a plurality of sensors is provided in order to enable an as precise as possible position determination. If necessary, the sensors are disposed preferably on the peg-shaped raised portions.

An advantageous development of the invention provides that the locking unit has a coupling sensor, by means of which it can be established whether locking unit and adaptor are coupled.

A magnetic sensor for example is suitable as coupling sensor.

Furthermore, the invention produces a coupling arrangement, containing a tool change system according to one of the claims 4 to 8 and a coupling device, by means of which the at least one adaptor and locking unit of the tool change system can be coupled automatically to each other at least partially, the coupling arrangement having a control unit, via which the coupling device can be controlled and which can detect and process the signals of the at least one force sensor, for at least partial automatic readjustment of the position of locking unit and adaptor during coupling.

By means of the force sensor, in particular the measuring signals which the force sensor picks up during coupling, can be compared with reference values. If there is sufficient correspondence between actual and reference values, then this indicates that the coupling process is taking place correctly. In the case of too great a discrepancy between the actual and reference values, the coupling device is able to correct the position of locking unit and adaptor in such a manner that the actual values are sufficiently near the reference values. Hence a feedback system is produced.

The coupling arrangement comprises for example a robot to which the locking unit is connected and a tool which is connected to an adaptor corresponding to the locking unit, said adaptor being located for example in a tool compartment. The robot would in this case be a coupling device. The control unit of the coupling arrangement would in this case be a control unit of the robot.

During operation, the control unit calls up for example the measuring signals of the sensor via the evaluation unit. Alternatively, it is likewise possible that the evaluation unit transmits control signals actively to the control unit.

The feedback and hence readjustment of the position of locking unit and adaptor is only possible when the force sensor picks up signals. This is at least the case when locking unit and adaptor come into mechanical contact. The coupling arrangement according to the invention enables an error-free, automatic implementation of the last step of the coupling process, i.e. from engagement of adaptor and locking unit until final coupling. Automation of precisely this step of the coupling process is particularly advantageous since, during this step, not only is inadequate coupling possibly produced by faulty coupling but possibly even the parts to be coupled could be damaged mechanically including the tool change system.

Preferably, a plurality of force sensors is present on the locking unit in the coupling region in order to be able to measure adequately, for readjustment, the mechanical loading which acts on the locking unit via the adaptor during coupling. Furthermore, the locking unit advantageously has an above-described peg-shaped raised portion and the adaptor a recess corresponding thereto. Via the measurement of the mechanical loading of the at least one peg-shaped raised portion, it can be detected, at an early stage of the coupling process, via the measurement of the mechanical loading of the peg-shaped raised portion, whether the coupling process is taking place operationally correctly and, if necessary, can be readjusted.

Furthermore, the invention produces a method for mechanical coupling of a coupling system, containing a first coupling part and at least one second coupling part which can be coupled mechanically to the first coupling part, according to which, by means of at least one force sensor which is located on the first coupling part and belongs to the first coupling part, the mechanical loading which acts on the first coupling part during coupling of first and second coupling part is measured, and, on the basis of the measured loading, the position of first coupling part and second coupling part is suitably readjusted for the coupling process.

As described above with respect to the coupling arrangement, location-dependent regions of reference values, i.e. dependent upon the relative position of first and second coupling part, are defined, which reference values indicate whether the mechanical loading measured at a specific place, i.e. the actual value, is within a suitable range. If the actual value is outwith the range of the reference values, then the position of first and second coupling part is readjusted.

The described method can be implemented in particular with a coupling arrangement as described above.

Furthermore, the invention produces a method for measuring the mechanical loading of a coupling system, containing a first coupling part and at least one second coupling part which can be coupled mechanically to the first coupling part, according to which, by means of at least one force sensor which is located on the first coupling part and belongs to the first coupling part, the mechanical loading between the first part and the second coupling part is measured in the coupled state and/or during coupling at least over a period of time, and the signals measured by the force sensor are picked up by an evaluation unit which is located on the first coupling part and belongs to the first part and are stored in a memory of the evaluation unit as retrievable data.

The method according to the invention can be implemented in particular with the above-described coupling system, tool change system and coupling arrangement.

Figure 4A:
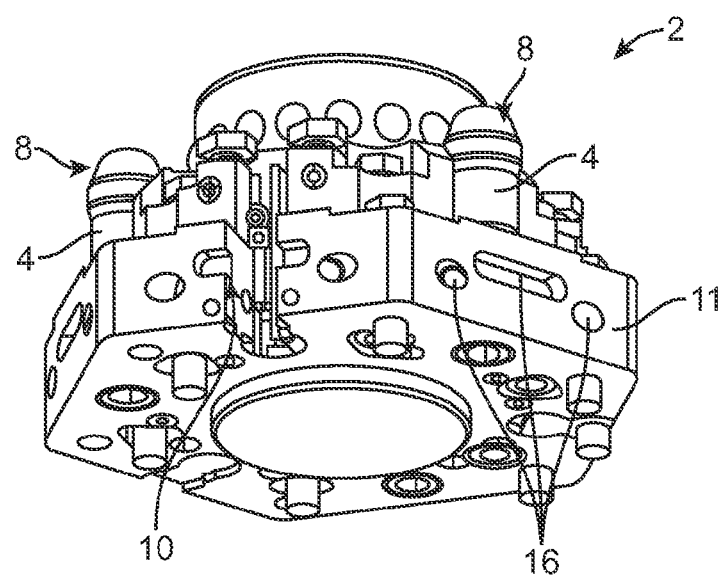
Figure 4B:
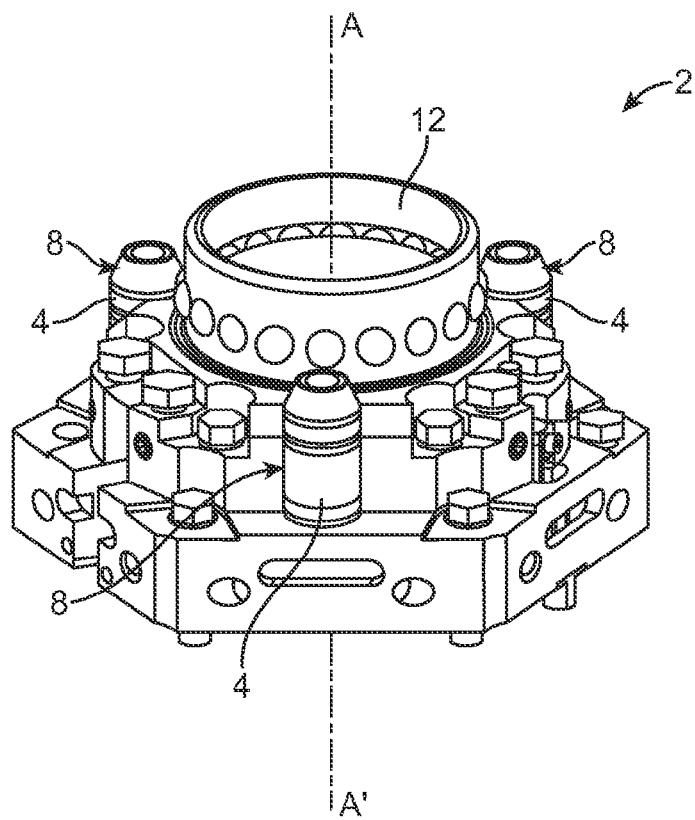
Figure 5A:
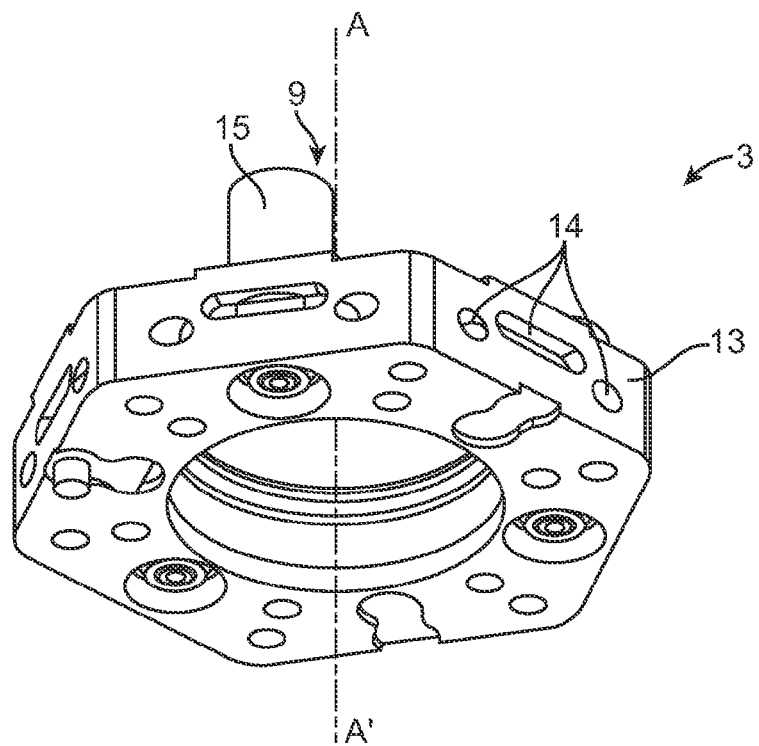
Figure 5B:
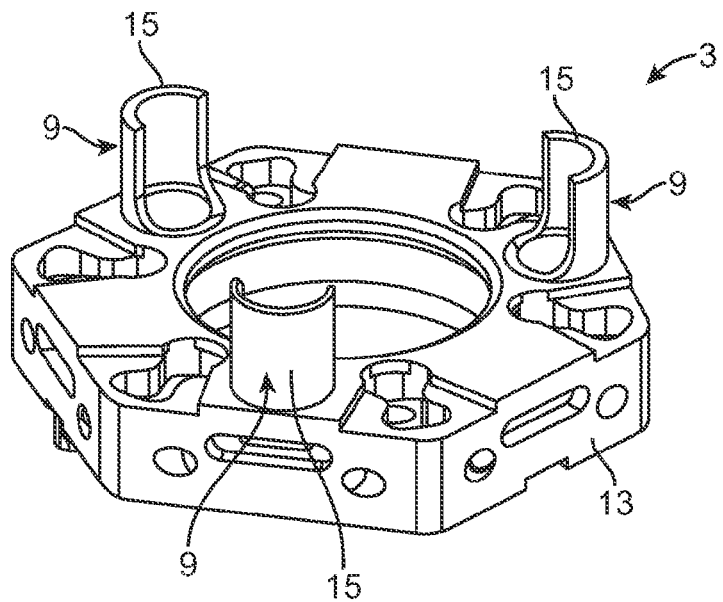

The invention is described subsequently in more detail with reference to embodiments which are represented by several Figures. There are shown:

FIG. 1 a tool change system together with a robot arm and a tool,

FIG. 2A a schematic view of a locking unit which belongs to the tool change system, FIG. 2B a schematic representation of an adaptor which belongs to the tool change system, FIG. 3 a schematic representation of the tool change system connected to the robot and to the tool, FIG. 4A a first detailed view of the locking unit, FIG. 4B a second detailed view of the locking unit, FIG. 5A a first detailed view of the adaptor, and FIG. 5B a second detailed view of the adaptor.

FIG. 1 shows an embodiment of a coupling system 1 according to the invention, containing a first coupling part 2 and a second coupling part 3 which can be coupled to the first coupling part 2 via at least one coupling. In this embodiment, the coupling system 1 is a tool change system. The coupling part 1 is a locking unit, the coupling part 2 is an adaptor 3 which can be coupled to the locking unit. The locking unit 2 can be connected securely to a robot 6 via a flange. The adaptor 3 can be connected securely to a tool 7 via a flange.

FIG. 2A shows a schematic representation of the locking unit 2.

The locking unit (VE) is essentially constructed in a planar manner. In the centre thereof, it has a mechanical coupling via which adaptor 3 and locking unit 2 can be connected mechanically in a stable manner (details are shown in FIGS. 4 and 5).

On the circumference of the mechanical coupling, three modules M1, M2 and M3, and an evaluation unit 5 are disposed. The modules M1, M2 and M3 are provided for the purpose of transferring power supply, data lines, media etc. from the robot side to the tool. In this case, the module M1 has at least one coupling for transferring a gaseous medium, here compressed air. The module M2 has at least one coupling for transferring liquid medium, here cooling water. The module M3 has at least one coupling for transferring power to the power supply of the tool 7.

Furthermore, the locking unit has a plurality of sensors Sen1, Sen2, Sen3 and Sen4 (see FIG. 3 in this respect). By means of the sensors Sen1, Sen2 and Sen3, the mechanical coupling between locking unit and adaptor can be checked. By means of the sensor Sen4, the compressed air coupling in the coupling region of the module M1 can be checked.

The sensors Sen1, Sen2, Sen3 and Sen4 are connected to the evaluation unit 5. The evaluation unit 5 detects the measuring signals of the sensors. The measuring signals of the sensors can be called up in addition via the evaluation unit 5.

FIG. 2B shows a schematic representation of the adaptor 3. The adaptor 3 is likewise constructed in a planar manner. In the centre, it has a mechanical coupling via which it can be coupled mechanically to the locking unit 2 (details see FIGS. 4, 5). Three modules M1', M2' and M3' are disposed externally around the mechanical coupling. The modules M1', M2' and M3' form coupling parts which correspond to the modules M1, M2 and M3 of the locking unit. During mechanical coupling of the locking unit 2 and of the adaptor 3, the modules M1, M2 and M3 are coupled also in the same action to the corresponding modules M1', M2' or M3'. Via the modules M1', M2' and M3', compressed air or cooling water or power supply are conducted further to the tool 7.

In addition, the adaptor 3 has a pressure sensor Sen5, with which the cooling water pressure in the region of the cooling water coupling of the module M2' can be checked.

FIG. 3 shows a schematic representation of the tool change system 1 which is connected via the locking unit 2 to the robot 6 and via the adaptor 3 to the tool 7.

The evaluation unit has a permanent memory, here an EPROM, by means of which the signals of the sensors connected to the evaluation unit can be stored permanently over a period of time.

In this embodiment, the sensors Sen1, Sen2, Sen3 are force sensors, by means of which the mechanical forces which are exerted on the locking unit 2 via the adaptor 3 can be measured at least in regions. The sensor unit Sen4 is a noise sensor unit, by means of which it can be checked whether the compressed air connection between the modules M1 and M1' is gas-tight. The sensor unit Sen5 is a pressure sensor unit which monitors the cooling water line in the region of the coupling of the modules M2 and M2' (alternatively or additionally, a noise sensor would also be possible for monitoring the cooling water line). The mechanical coupling region and the coupling regions of the modules M1 M1', M2 M2' and M3 M3' are thereby represented in FIG. 3 by respectively hatched areas.

The sensors Sen1, Sen2 and Sen3 are connected directly to the evaluation unit for transmitting the signals. The sensor unit Sen4 is connected via the module M1 and an interface S4 to the evaluation unit, the sensor unit Sen5 is connected via the module M2', M2 and an interface S3 of the evaluation unit to the evaluation unit.

The robot-side output port of the compressed air line is designated with K1. The compressed air line leads from the outlet port K1 via the module M1 and the module M1' to the input port K1' on the tool side. Analogously, the cooling water line leads from an output port K2 on the robot side via the module M2 and module M2' to a tool-side input port K2'. The power supply leads from a robot-side output port K3 via the module M3 and the module M3' to a tool-side inlet port K3'.

On the robot side, a control unit is provided, by means of which the output ports K1, K2 and K3 can be checked. Furthermore, the control unit has an interface S1', via which it is coupled via an interface S1 of the evaluation unit to the evaluation unit. In addition, the control unit has an interface S2' which can be used for the purpose of connecting the control unit to a network or the like.

The evaluation unit has, in addition to an input-output region which is provided for controlling and scanning the sensors, a CPU, configured here as a microcontroller, a permanent memory and interfaces S1, S2, S3 and S4, as was mentioned already above in part. The evaluation unit picks up the measuring signals of the sensors Sen1 to Sen5, processes these and stores these as retrievable data in the permanent memory. These data can be called up via a suitable interface. In this embodiment, the data can be called up in particular via the interface S2 via teletransmission. Alternatively, it would likewise be possible to call up the data via an electrical connection, in particular a data cable, a radio connection or an optical connection, in particular via an optical fibre, in the case of a suitably configured interface.

Furthermore, the evaluation unit contains a device with which at least one short-term power failure can be bridged. In this case, a capacitor with a high capacitance is provided for this purpose.

Furthermore, the evaluation unit has an active RFID (radio frequency identification) unit which can correspond with a corresponding passive RFID unit in the tool 7, and hence makes it possible to establish which tool is currently connected to the tool change system and hence to the robot. This information can be stored likewise in the permanent memory.

FIGS. 4A and 4B show a detailed view of the locking unit 2. However only the region which can be connected, on the one hand, to the robot flange and via which the mechanical coupling to the adaptor can be produced is represented.

The locking unit has a hexagonal, planar base plate 11. In the middle of this base plate 11, a pneumatic locking unit 12 is disposed (an electrical locking unit would also be conceivable as an alternative). On the sides of the base plate, a plurality of attachment points 16 is provided, which enable attachment of various components, in particular of the modules M1, M2 and M3 and also of the evaluation unit 5.

On the circumference of the pneumatic locking unit 12, three peg-shaped raised portions 8 are disposed. The three peg-shaped raised portions 8 are disposed in a common plane distributed uniformly about the locking unit 12 at a constant radius. Peg-shaped raised portions 8 and locking unit 12 are orientated along a common connection axis A, A'.

FIGS. 5A and 5B show a detailed view of the adaptor 3. However, the region of the adaptor 3 which is provided for mechanical coupling to the locking unit 2 and to the tool 7 is represented here exclusively.

Analogously to the locking unit 2, the adaptor 3 has a hexagonal base plate 13. The centre of this base plate 13 is provided with the locking unit 2 for the mechanical locking. For this purpose, a circular boring with grooves is provided in the outer surfaces, which form undercuts and via which the lock 12 of the locking unit 2 can be clamped mechanically in the adaptor 3.

There are different attachment possibilities 14 on the outer surface of the base plate 13 via key and keyway, by means of which the mechanical connection of modules etc. is made possible.

Furthermore, three half-shell-shaped elements 15 are disposed securely on the base plate 13, said elements forming recesses 9 which correspond to the peg-shaped raised portions 8 of the locking unit 2. During the coupling process of adaptor 3 and locking unit 2, the peg-shaped raised portions 8 and the recesses 9 of the adaptor 3 which correspond thereto have the effect that the adaptor 3 and the locking unit 2 are connected to each other on a defined axis AA' and at a defined position. The peg-shaped raised portions 8 and recesses 9 formed by the raised portions 15 guide the adaptor and the locking unit during coupling.

The peg-shaped raised portions 8 of the locking unit 2 are configured with a conical tip. In this way, the "threading in" of the adaptor 3 is facilitated.

Furthermore, the peg-shaped raised portions 8 of the locking unit 2 and the half-shell-shaped raised portions 9 of the adaptor 3 are configured in such a manner that, during coupling, a planar contact exists between all the peg-shaped raised portions 8 and half-shell shaped raised portions 15. Furthermore, the base of the half-shell-shaped raised portions 15 of the adaptor 3 has a conical configuration, as a result of which, in the coupled state of adaptor 3 and locking unit 2, clamping is effected between locking unit 2 and adaptor 3.

The force sensors Sen1, Sen2 and Sen3 are disposed respectively in a peg-shaped raised portion 8 of the locking unit. Hence the mechanical loading of the peg-shaped raised portion 8 can be measured with the force sensors. As soon as the adaptor 3 with its half-shell-shaped raised portions 15 contacts the peg-shaped raised portions 8 of the locking unit 2, a mechanical loading on the peg-shaped raised portions 8 is exerted and can be detected by the sensors. The mechanical loading of the individual peg-shaped raised portions 8 can be measured over the entire coupling process and stored. Also in the coupled state of adaptor 3 and locking unit 2, the mechanical loading can be measured via the peg-shaped raised portions 8.

The loading which acts on the tool 7 connected to the adaptor 3 is transferred via the adaptor 3 also to the peg-shaped raised portions 8. It is hence possible to draw a conclusion, via the measurement of the mechanical loading of the peg-shaped raised portion 8, about the loading of the tool 7 connected to the adaptor 3. On the basis of the arrangement of the sensors, for example also bending moments and torsion moments which act in particular directly or indirectly via the tool on the tool change system (or multicoupling system) are measured.

Furthermore, the locking unit 2 has a coupling sensor 10, by means of which it can be established whether locking unit 2 and adaptor 3 are coupled to each other. In this embodiment, the coupling sensor is a magnetic sensor 10 which is introduced in a recess in the hexagonal base plate 11 on the edge side. If the adaptor 3 is connected completely to the locking unit 2, then the coupling sensor 10 emits a signal. The signal is detected by the evaluation unit and likewise stored in the memory.

Furthermore, the locking unit has at least one position sensor which checks the position of locking unit and adaptor in at least one position before the coupling position.

Robots with connected locking unit 2 and adaptor 3 with a connected tool 7 form a coupling arrangement which makes it possible to couple the tool 7 automatically to the robot 6.

The starting point is for example that the tool 7 with connected adaptor 3 is located in a tool compartment, and the robot 6 is now intended to receive the tool 7 via the locking unit 2.

Positioning the robot in such a manner that locking unit 2 and adaptor 3 shortly before contact is not critical and can be automated without problems. What is critical is the last step of the coupling process in which adaptor 3 and locking unit 2 come in mechanical contact with each other. Even small positional errors between adaptor 3 and locking unit 2 can lead here to high mechanical loading which can lead to damage to the tool change system or even to the robot of the tool 7.

According to the invention, the control unit of the robot which controls the movement of the robot is connected to the evaluation unit 5. The evaluation unit 5 has a programme with which the signals of the force sensors can be evaluated and which can be transmitted as suitable signals to the control unit of the robot. Via the force sensors which measure the mechanical loading and act on the peg-shaped raised portions 8 of the locking unit 2, the mechanical loading which, in the last step of coupling of adaptor 3, acts on the locking unit 2, is detected early. The measuring values can be used for the purpose of comparing these with reference values and, if a serious deviation is established, for transmitting suitable control signals to the control unit of the robot in order that the latter can suitably correct the position of locking unit 2 and adaptor 3. In this way, an almost load-free automatic coupling of adaptor 3 and locking unit 2 is possible.

In particular, also the "teaching" of the robot can be automated in this way. During the "teaching", the movement course of the robot which the robot must travel over in order to pick up the tool from the tool compartment and deposit it again is established. Errors which can occur during manual "teaching", in particular in that the movement course of the robot has not been adjusted exactly enough, can be prevented by the proposed automation.

A preferred use according to the invention of the described system is the monitoring of the coupling region, in particular monitoring of the mechanical loading in the coupling region during coupling and also during the operating state. It is possible in this way to detect errors in the coupling region rapidly, to extend the serviceable life of the coupled partners as much as possible and to prevent inexpert handling, in particular inexpert overloading. It is possible in particular via the documentation of the signals to follow the operation of the coupling system and the partners associated therewith also subsequently, as a result of which it becomes possible to establish the origins of the errors.

The invention claimed is:

1. A coupling system, comprising:
   a first coupling part comprising a first base plate, at least one support post extending from said base plate;
   a second coupling part comprising a second base plate having at least one recess configured to receive said at least one support post;
   said first coupling part and said second coupling part configured to be coupled and uncoupled to each other;
   a force sensor configured to measure the mechanical loading on said at least one support post in at least two spatial directions such that the measured forces may be used to determine a state of the coupling between the first coupling part and the second coupling part; and
   an evaluation unit disposed on said first coupling part and operably coupled to said force sensor, said evaluation unit configured to detect measurement signals from said force sensor,
   wherein
   said first coupling part is a locking unit which is configured to be attached to a robot, and said first coupling part is configured to couple a plurality of functions, and
   said second coupling part is an adaptor which is configured to be attached to a tool, and said second coupling part is configured to couple a plurality of functions.

2. The coupling system of claim 1, wherein said evaluation unit comprises a permanent memory which can store said measurement signals permanently over a period of time.

3. The coupling system of claim 1, wherein said plurality of functions includes functions selected from the group of electrical coupling, coupling of fluid lines, and mechanical coupling.

4. The coupling system of claim 1, wherein said at least one force sensor is configured to measure the mechanical forces exerted on said locking unit in at least two different regions.

5. The coupling system of claim 1, wherein said force sensor is disposed on or in said support post.

6. The coupling system of claim 1, wherein said locking unit comprises at least one position sensor which detects the relative position of said locking unit and said adaptor in at least one position before a fully coupled position.

7. The coupling system of claim 1, wherein said locking unit has a coupling sensor configured to determine whether said locking unit is fully coupled to said adaptor.

8. The coupling system of claim 1, further comprising a control unit which controls the relative position of the locking unit and the adaptor, said control unit operably coupled to said at least one force sensor and configured to adjust the relative position of the locking unit and the adaptor based on the measurement signals from said at least one force sensor.

9. The coupling system of claim 1, wherein said at least one force sensor is configured to measure the mechanical loading on said at least one support post in at least three spatial directions.

10. A coupling system, comprising:
a first coupling part comprising a first base plate, at least one support post extending from said base plate;
a second coupling part comprising a second base plate having at least one recess configured to receive said at least one support post;
said first coupling part and said second coupling part configured to be coupled and uncoupled to each other;
a force sensor configured to measure the mechanical loading on said first coupling part; and
an evaluation unit disposed on said first coupling part and operably coupled to said force sensor, said evaluation unit configured to detect measurement signals from said force sensor,
wherein
said first coupling part is a locking unit which is configured to be attached to a robot, and said first coupling part is configured to couple a plurality of functions, and
said second coupling part is an adaptor which is configured to be attached to a tool, and said second coupling part is configured to couple a plurality of functions.

11. The coupling system of claim 10, wherein said evaluation unit comprises a permanent memory which can store said measurement signals permanently over a period of time.

12. The coupling system of claim 10, said plurality of functions includes functions selected from the group of electrical coupling, coupling of fluid lines, and mechanical coupling.

13. The coupling system of claim 10, wherein said at least one force sensor is configured to measure the mechanical forces exerted on said locking unit in at least two different regions.

14. The coupling system of claim 10, wherein said force sensor is disposed on or in said support post.

15. The coupling system of claim 10, wherein said locking unit comprises at least one position sensor which detects the relative position of said locking unit and said adaptor in at least one position before a fully coupled position.

16. The coupling system of claim 10, wherein said locking unit has a coupling sensor configured to determine whether said locking unit is fully coupled to said adaptor.

17. The coupling system of claim 10, further comprising a control unit which controls the relative position of the locking unit and the adaptor, said control unit operably coupled to said at least one force sensor and configured to adjust the relative position of the locking unit and the adaptor based on the measurement signals from said at least one force sensor.

18. The coupling system of claim 10, wherein said at least one force sensor is configured to measure the mechanical loading on said first coupling part in at least three spatial directions.

19. The coupling system of claim 10, wherein said evaluation unit further comprises a backup power source.

20. The coupling system of claim 10, wherein said recess of said second coupling part comprises at least one half-shell shaped element extending from said second base plate which is shaped to receive said support post.

* * * * *